(12) United States Patent
Kang et al.

(10) Patent No.: US 9,846,339 B2
(45) Date of Patent: Dec. 19, 2017

(54) LIQUID CRYSTAL DISPLAY

(71) Applicant: Samsung Display Co. Ltd., Yongin-si (KR)

(72) Inventors: Tae Ho Kang, Incheon (KR); Hae Ryeong Park, Hwaseong-si (KR); Yong Jo Kim, Seoul (KR); Dong Il Yoo, Hwaseong-si (KR); Tae Kyung Yim, Seoul (KR); Nak Cho Choi, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/182,911

(22) Filed: Jun. 15, 2016

(65) Prior Publication Data
US 2017/0123280 A1    May 4, 2017

(30) Foreign Application Priority Data

Nov. 3, 2015 (KR) .................. 10-2015-0153729

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1337* (2013.01); *G02F 1/1368* (2013.01); *G02F 1/13439* (2013.01); *G02F 1/133345* (2013.01); *G02F 1/133514* (2013.01); *G02F 1/136286* (2013.01); *G02F 1/133305* (2013.01);
(Continued)

(58) Field of Classification Search
CPC .. G02F 1/136; G02F 1/1362; G02F 1/136286; G02F 1/136213; G02F 1/133707; G02F 1/1368; G02F 1/133345; G02F 1/134309; G02F 1/1333; G02F 1/136209; G02F 1/1335; G02F 1/133512; G02F 1/133514; G02F 1/134336; G02F 1/1343; G02F 1/136227; G02F 2001/134345; G02F 2001/136222; G02F 2201/40; G02F 2201/123; G02F 1/134363; H01L 27/1255; H01L 29/41733
USPC ... 349/38, 139, 144, 106, 143, 43, 138, 141, 349/39, 42; 257/72, E29.117, E29.151, 257/E29.273, 59
See application file for complete search history.

(56) References Cited

U.S. PATENT DOCUMENTS 6,900,853 B2    5/2005  Watanabe et al.
2015/0277192 A1* 10/2015 Park .................. G02F 1/136286
                                                349/43

\* cited by examiner

*Primary Examiner* — Thoi Duong
(74) *Attorney, Agent, or Firm* — Cantor Colburn LLP

(57) ABSTRACT

A liquid crystal display includes a substrate on which a pixel region is defined, a first sub-pixel electrode in the pixel region on the substrate, an insulating layer on the first sub-pixel electrode, a second sub-pixel electrode in the pixel region on the insulating layer, a floating electrode in the pixel region on the insulating layer and disconnected from the second sub-pixel electrode, a liquid crystal layer on the second sub-pixel electrode and the floating electrode, and a common electrode disposed on the liquid crystal layer. The floating electrode includes first to fourth floating electrodes in first to fourth quadrants of the pixel region, respectively. The first to fourth floating electrodes are separated from one another, and the first sub-pixel electrode partially overlaps the second sub-pixel electrode and the first to fourth floating electrodes.

20 Claims, 8 Drawing Sheets

(51) Int. Cl.
*G02F 1/1333* (2006.01)
*G02F 1/1335* (2006.01)
*G02F 1/1337* (2006.01)
*G02F 1/1362* (2006.01)

(52) U.S. Cl.
CPC .............. *G02F 2001/13629* (2013.01); *G02F 2001/133357* (2013.01); *G02F 2001/133742* (2013.01); *G02F 2001/134345* (2013.01); *G02F 2001/136295* (2013.01); *G02F 2201/121* (2013.01)

LIQUID CRYSTAL DISPLAY

This application claims priority to Korean Patent Application No. 10-2015-0153729, filed on Nov. 3, 2015, and all the benefits accruing therefrom under 35 U.S.C. §119, the content of which in its entirety is herein incorporated by reference.

BACKGROUND

1. Field

The invention relates to a liquid crystal display.

2. Description of the Prior Art

A liquid crystal display has characteristics of low operating voltage, low power consumption, and portability, and thus a liquid crystal display has been widely used in various fields including a notebook computer, a monitor, an airship, an aircraft, and the like.

In general, a liquid crystal display includes an array substrate that displays an image using light transmittance of liquid crystals, an opposite substrate that is opposite to the array substrate, and a liquid crystal layer that is arranged between the array substrate and the opposite substrate. The liquid crystal layer includes liquid crystal molecules, and the polarization state of light that passed through the liquid crystal layer is changed in accordance with an alignment of the liquid crystal molecules to control luminance of the displayed image.

Such a liquid crystal display includes pixels representing different colors, and a certain color may be represented by a combination of the colors that the pixels represent. In general, the pixels may represent red (R), green (G), and blue (B), and various colors may be displayed by a combination of the red (R), green (G), and blue (B).

SUMMARY

In a liquid crystal display, each pixel includes a pixel electrode arranged thereon, and the alignment of the liquid crystal molecules is changed in accordance with the structure of the pixel electrode. However, the liquid crystal molecules may not be aligned as intended in accordance with the structure of the pixel electrode, and this may cause a texture that is visually recognized as a dark region to be generated. Such a texture may cause transmittance of the liquid crystal display to be decreased. Accordingly, there is a need for a pixel electrode structure that can minimize generation of such a texture.

Accordingly, exemplary embodiments of the invention are directed to a liquid crystal display including a pixel electrode having a structure that may minimize generation of a texture.

According to an exemplary embodiment of the invention, a liquid crystal display includes a substrate on which a pixel region is defined, a first sub-pixel electrode disposed in the pixel region on the substrate, an insulating layer disposed on the first sub-pixel electrode, a second sub-pixel electrode disposed in the pixel region on the insulating layer, a floating electrode disposed in the pixel region on the insulating layer and disconnected from the second sub-pixel electrode, a liquid crystal layer disposed on the second sub-pixel electrode and the floating electrode, and a common electrode disposed on the liquid crystal layer. In such an embodiment, the floating electrode includes a first floating electrode disposed in a first quadrant among four quadrants defined by dividing the pixel region by four, a second floating electrode disposed in a second quadrant of the four quadrants, a third floating electrode disposed in a third quadrant of the four quadrants, and a fourth floating electrode disposed in a fourth quadrant of the four quadrants. In such an embodiment, the first to fourth floating electrodes are disposed to be separated from one another, and the first sub-pixel electrode overlaps at least a portion of the second sub-pixel electrode and at least a portion of each of the first to fourth floating electrodes.

According to another exemplary embodiment of the invention, a liquid crystal display includes a substrate on which a pixel region is defined, a gate line disposed on the substrate and extending in a first direction, a sustain line disposed on the substrate and extending in the first direction, a data line disposed on the substrate and extending in a second direction which crosses the first direction, a first sub-pixel electrode disposed in the pixel region on the substrate, an insulating layer disposed on the first sub-pixel electrode, a second sub-pixel electrode disposed in the pixel region on the insulating layer, a floating electrode disposed in the pixel region on the insulating layer and disconnected from the second sub-pixel electrode, a liquid crystal layer disposed on the second sub-pixel electrode and the floating electrode, and a common electrode disposed on the liquid crystal layer. In such an embodiment, the gate line, the sustain line and the data line are disposed on an outside of the pixel region, the sustain line is disposed between the floating electrode and the gate line, and the sustain line is spaced apart from the floating electrode with a distance in a range of about 3 micrometers (μm) to about 4 μm.

According to embodiments of the invention, a liquid crystal display including a pixel electrode that may minimize generation of a texture is provided.

The effects according to the invention are not limited to the contents as exemplified above, but further various effects are included in the description.

BRIEF DESCRIPTION OF THE DRAWINGS

The above and other objects and features of the invention will be more apparent from the following detailed description taken in conjunction with the accompanying drawings, in which.

DETAILED DESCRIPTION

Figure 1:
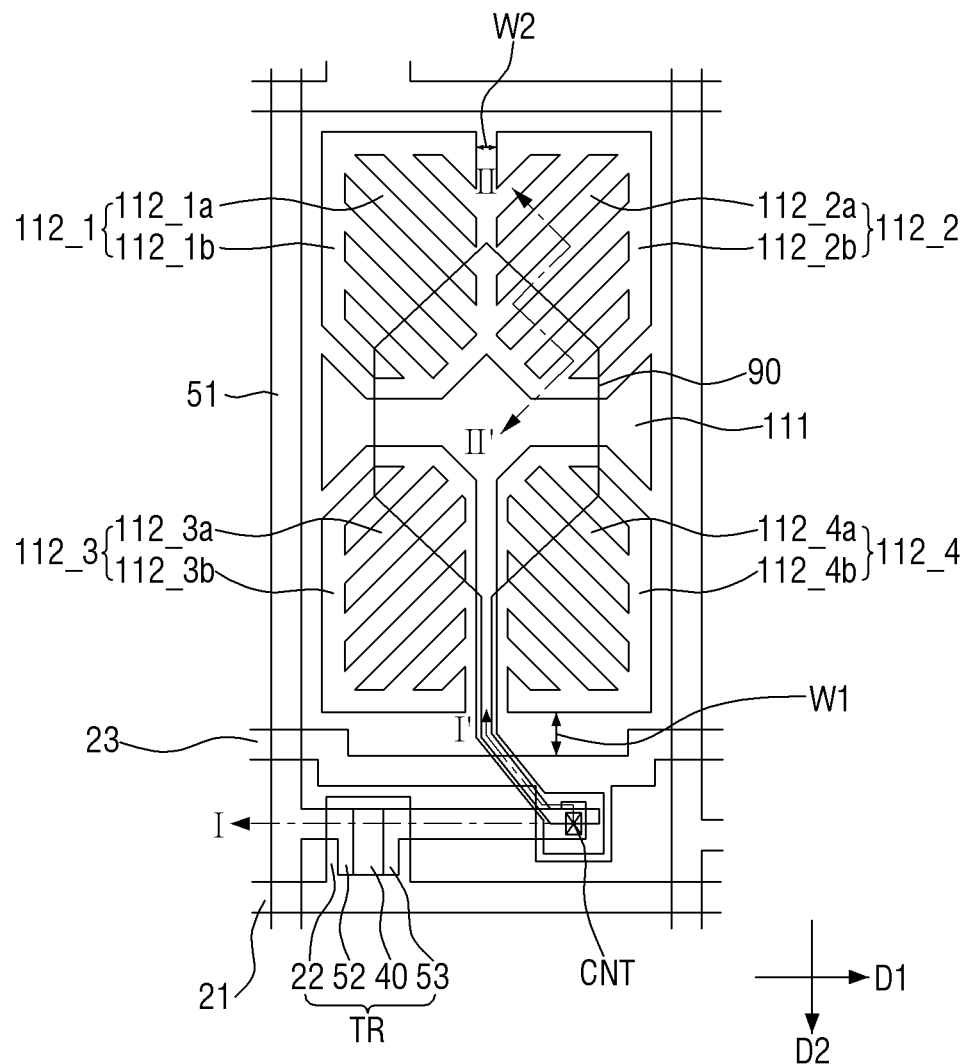
FIG. 1 is a plan view of a pixel of an embodiment of a liquid crystal display according to the invention.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
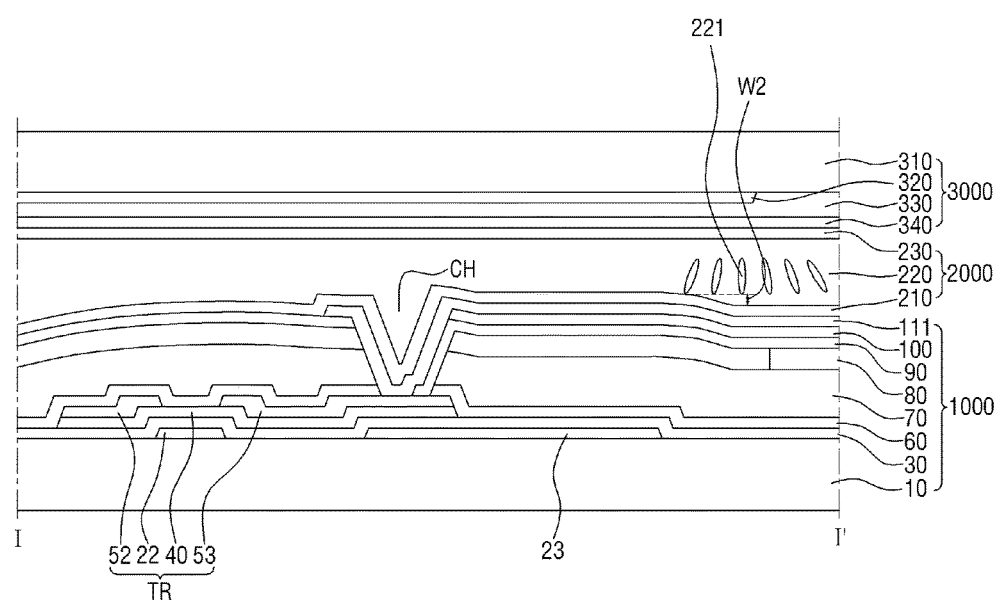
FIG. 2 is a cross-sectional view taken along line I-I' of FIG. 1.

FIG. 1 is a plan view of a pixel of an embodiment of a liquid crystal display according to the invention. FIG. 2 is a cross-sectional view taken along line I-I' of FIG. 1, and FIG. 3 is a cross-sectional view taken along line II-IF of FIG. 1.

Figure 3:
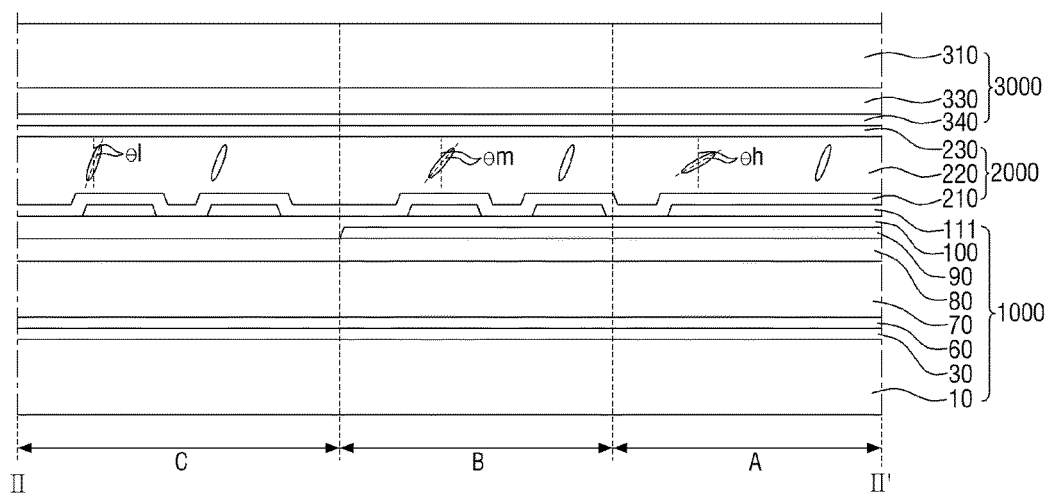
FIG. 3 is a cross-sectional view taken along line II-IF of FIG. 1.

Referring to FIGS. 1 to 3, an embodiment of a liquid crystal display according to the invention includes an array substrate 1000, an opposite substrate 3000, and a liquid crystal layer 2000.

The array substrate 1000 is a substrate on which transistors for controlling liquid crystal molecules 220 of the liquid crystal layer 2000 are disposed, and the opposite substrate 3000 is a substrate that is disposed opposite to the array substrate 1000.

Hereinafter, the array substrate 1000 will be described.

In an embodiment, as shown in FIG. 2, the array substrate 1000 includes a first base substrate 10. The first base substrate 10 may be a transparent insulating substrate. In one exemplary embodiment, for example, the first base substrate 10 may include or be formed of a glass substrate, a quartz substrate, or a transparent resin substrate. In an embodiment, the first base substrate 10 may include high heat resistance polymer or plastic. The first base substrate 10 may be a flat plate type, or may be curved in a specific direction. The first base substrate 10 may be in the form of a rectangle having four sides on a plane, may have a polygonal or circular structure, or may have a structure in which a part of a side has a curve.

The first base substrate 10 may be a flexible substrate. In such an embodiment, the first base substrate 10 may be a substrate having a changeable shape, such as rolling, folding or bending. Herein, a flexible substrate means that a substrate has a specific flexure rigidity of about $1.04 \times 10^{-10}$ to about $1.2 \times 10^{-1}$ Nm, e.g., about $8.33 \times 10^{-10}$ to about $9.75 \times 10^{-3}$ Nm, or about $1.15 \times 10^{-9}$ to $2.6 \times 10^{-3}$ Nm.

In such an embodiment, a gate line 21, a sustain line 23 and a gate electrode 22 are disposed on the first base substrate 10. The gate line 21 and the sustain line 23 may extend in a first direction D1. The gate line 21 and the gate electrode 22 may transfer a gate voltage. In such an embodiment, the sustain line 23 may transfer a sustain signal.

Here, the first direction D1 corresponds to a direction that extends in parallel to one side of the first base substrate 10, and as illustrated in FIG. 1, may be defined as a direction that is indicated by a certain straight line that extends from left to right, but is not limited thereto. Alternatively, the first direction may not be in parallel to one side of the first base substrate 10, but the first direction may be a direction that is indicated by a straight line that extends from the first base substrate 10 in a specific direction.

In an embodiment, the gate line 21 and the sustain line 23 may extend substantially in the first direction D1, but at least a portion of the gate line 21 or the sustain line 23 may extend in a direction different from the first direction D1. In such an embodiment, the gate line 21 and the sustain line 23 connected to the pixels may generally extend in the first direction D1.

The gate voltage may be a signal having a voltage value that is provided from an outside to be changed, and the on/off operation of a switching device TR to be described later may be controlled by the voltage value of the gate voltage.

In an embodiment, the sustain signal may be a signal having a constant voltage value that is provided from the outside, and the voltage charging characteristic of the pixel electrode to be described later may be improved by the sustain signal, or the voltage sustain time of the pixel electrode may be lengthened by the sustain signal.

The gate electrode 22 may project from the gate line 21, and may be a constituent element that constitutes the switching device TR to be described later.

The gate line 21 and the gate electrode 22 may include an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum or a molybdenum alloy, chrome (Cr), tantalum (Ta), or titanium (Ti).

In an embodiment, the gate line 21, the sustain line 23 and the gate electrode 22 may have a single-layer structure or a multilayer structure that includes at least two conductive layers having different physical properties. In such an embodiment, one of the conductive layers may include or be made of a low-resistance metal, for example, an aluminum-based metal, a silver-based metal, or a copper-based metal, to prevent a signal delay or voltage drop of the gate line 21, the sustain line 23, and the gate electrode 22. In such an embodiment, the other of the conductive layers may include or be made of a material having high contact characteristics with other materials, e.g., indium tin oxide ("ITO") and indium zinc oxide ("IZO"). In one embodiment, for example, the other of the conductive layers may include a molybdenum-based metal, chrome, titanium, or tantalum. In one embodiment, for example, the gate line 21, the sustain line 23 and the gate electrode 22 may have a lower chrome layer and an upper aluminum layer, or a lower aluminum layer and an upper molybdenum layer. However, the invention is not limited thereto, and the gate line 21, the sustain line 23 and the gate electrode 22 may include or be formed of various kinds of metals and conductors.

In an embodiment, a gate insulating layer 30 is disposed on the gate line 21, the sustain line 23 and the gate electrode 22. The gate insulating layer 30 may insulate the constituent elements, such as the gate line 21, the sustain line 23 and the gate electrode 22, which are arranged on a lower portion of the gate insulating layer 30 from other constituent elements which are arranged on an upper portion of the gate insulating layer 30. In an embodiment, the gate insulating layer 30 may include or be made of an insulating material. In one exemplary embodiment, for example, the gate insulating layer 30 may include or be made of silicon nitride, silicon oxide, silicon oxynitride, or a high-k material. The gate insulating layer 30 may have a single-layer structure or a multilayer structure that includes two insulating layers having different physical properties from each other.

In an embodiment, a semiconductor layer 40 is disposed on the gate insulating layer 30. The semiconductor layer 40 may be arranged to at least partly overlap the gate electrode 22. The semiconductor layer 40 may include amorphous silicon, polycrystalline silicon, or oxide semiconductor.

Although not illustrated in the drawing, an ohmic contact member may be further disposed on the semiconductor layer 40. The ohmic contact member may be include or formed of n+ hydrogenated amorphous silicon doped with high-density n-type impurities or silicide. A pair of the ohmic contact members (not illustrated) may be arranged on the semiconductor layer 40. In an embodiment, where the semiconductor layer 40 is made of oxide semiconductor, the ohmic contact member (not illustrated) may be omitted.

In an embodiment, a data line 51, a source electrode 52 and a drain electrode 53 are disposed on the semiconductor layer 40 and the gate insulating layer 30.

The data line 51 extends in a second direction D2. Here, the second direction D2 may be a direction that vertically crosses the first direction D1, and as illustrated in FIG. 1, may be a direction that is indicated by a certain straight line extending from an upper side to a lower side. The data line 51 may be insulated from the gate line 21 and the sustain line 23 by the gate insulating layer 30 disposed therebetween.

The data line 51 may provide a data voltage that is input from the outside to the source electrode 52. Here, the data voltage may be a signal having a voltage value that is provided from the outside to be changed, and grayscales of the respective pixels may be controlled to correspond to the data voltage.

The source electrode 52 may be branched and project from the data line 51. The source electrode 52 may receive the data voltage that is transferred through the data line 51.

The drain electrode 53 may be spaced apart from the source electrode 52 when viewed from a top plan view, which is a plan view in a thickness direction of the liquid display.

In an embodiment, as illustrated in FIG. 1, the source electrode 52 and the drain electrode 53 may be arranged so that partial sections thereof extend in a same direction to be parallel to each other. However, the shapes of the source electrode 52 and the drain electrode 53 are not limited thereto, and in an alternative embodiment, the source electrode 52 may be formed to surround the drain electrode 53 in a "U" shape.

In an embodiment, the semiconductor layer 40 may be arranged in a region between the drain electrode 53 and the source electrode 52, which are be spaced apart from each other when viewed from the top plan view. In such an embodiment, the drain electrode 53 and the source electrode 52 may partially overlap the semiconductor layer 40 or may come in contact with the semiconductor layer 40. The drain electrode 53 and the source electrode 52 may be arranged to face each other in a state where the semiconductor layer 40 is interposed between the drain electrode 53 and the source electrode 52.

The data line 51, the source electrode 52 and the drain electrode 53 may include or be formed of aluminum, copper, silver, molybdenum, chrome, titanium, tantalum, or an alloy thereof, and may have a multilayer structure including a lower layer (not illustrated) of refractory metal and a low-resistance upper layer (not illustrated) disposed on the lower layer.

The gate electrode 22, the source electrode 52 and the drain electrode 53 collective define a switching device TR together with the semiconductor layer 40. The switching device TR may be a thin film transistor.

The switching device TR may electrically connect the source electrode 52 and the drain electrode 53 to each other in accordance with the level of the gate voltage that is provided to the gate electrode 22. When the gate voltage that is provided to the gate electrode 22 corresponds to the voltage that turns off the switching device TR, the source electrode 52 and the drain electrode 53 are not electrically connected to each other. When the gate voltage that is provided to the gate electrode 22 corresponds to the voltage that turns on the switching device TR, the source electrode 52 and the drain electrode 53 are electrically connected to each other through a channel that is formed in the semiconductor layer 40.

The channel may be formed around the region between the source electrode 52 and the drain electrode 53 on the semiconductor layer 40. When the switching device TR is in a turn-on state, the channel may be formed around the semiconductor layer 40 that is arranged on the region between the source electrode 52 and the drain electrode 53, such that a voltage may be transferred through the channel and current may flow.

In such an embodiment, the data voltage that is provided to the data line 51 may be provided to another constituent element that is not the semiconductor layer 40 connected to the drain electrode 53, and whether to transfer the data voltage may be controlled by the gate voltage that is provided to the gate line 21.

A passivation layer 60 may be disposed on the data line 51, the source electrode 52, the drain electrode 53 and the semiconductor layer 40. The passivation layer 60 may include or be made of an inorganic insulating material, and may cover and protect the data line 51 and the switching device TR disposed below the passivation layer 60.

In an embodiment, a color filter layer 70 is arranged on the passivation layer 60. The color filter layer 70 includes a plurality of color filters. The color filters may transmit specific wavelength band components of light that is incident from the outside of the first base substrate 10 and may intercept other wavelength band components, and thus the light that is emitted to the outside of a second base substrate 310 may have a specific color.

In one exemplary embodiment, for example, a red color filter that is a color filter for being visually recognized as red may transmit light having a wavelength band of about 580 nanometers (nm) to about 780 nm, and absorb (and/or reflect) light having the remaining wavelength band. A green color filter that is a color filter for being visually recognized as green may transmit light having a wavelength band of about 450 nm to about 650 nm, and absorb light having the remaining wavelength band. Further, a blue color filter that is a color filter for being visually recognized as blue may transmit light having a wavelength band of about 380 nm to about 560 nm, and absorb light having the remaining wavelength band. The red color filter may include or be formed of a pigment or a photosensitive organic material that presents red, the green color filter may include or be formed of a pigment or a photosensitive organic material that presents green, and the blue color filter may include or be formed of a pigment or a photosensitive organic material that presents blue.

In an exemplary embodiment, the color filter layer 70 may be disposed adjacent to the array substrate 1000, but not being limited thereto. In an alternative embodiment, the color filter layer 70 may be disposed adjacent to the opposite substrate 3000. In such an embodiment, the color filter layer 70 may be arranged adjacent to a light blocking member 320 to be described later.

A planarization layer 80 is disposed on the color filter layer 70. The planarization layer 80 may planarize an upper portion of the color filter layer 70 on which a step height occurs due to the gate line 21, the sustain line 23, the data line 51, the switching device TR and the color filter layer 70.

In such an embodiment, where the planarization layer 80 mitigates the step height, complete planarization may not be provided, and step heights may partially occur in the planarization layer 80 due to the constituent elements arranged below the planarization layer 80.

The planarization layer 80 may include or be made of an organic material. In one exemplary embodiment, for example, the planarization layer 80 may be made of a photosensitive organic composition. However, the planarization layer 80 may be omitted.

In an embodiment, a contact hole CH for exposing a part of the switching device TR, more specifically, a part of the drain electrode 53, may be defined or formed in the planarization layer 80 and the passivation layer 60. The contact hole CH may be formed to vertically penetrate a protection layer, the color filter layer 70 and the passivation layer 60. Accordingly, the contact hole CH may expose a part of the drain electrode 53, and the other part of the drain electrode 53 may be covered by the planarization layer 80 and the passivation layer 60. In such an embodiment, the contact hole CH may be formed for each pixel.

The contact hole CH may be formed through patterning after the passivation layer 60, the color filter layer 70 and the planarization layer 80 are formed. The part of the drain electrode 53 and partial constituent elements on the protection layer may be physically and electrically connected to each other through a conductive material provided inside the contact hole CH. Here, the conductive material disposed inside the contact hole CH may be a part of the pixel electrode to be described later.

A first sub-pixel electrode 90 is disposed on the planarization layer 80. The first sub-pixel electrode 90 may include or be made of a transparent conductive material, such as ITO, IZO, indium tin zinc oxide ("ITZO"), or aluminum zinc oxide ("AZO"). In such an embodiment, as shown in FIG. 1, the first sub-pixel electrode 90 may be connected to the drain electrode 53 through the contact hole CH, and may receive the data voltage that is applied from the drain electrode 53. In such an embodiment, the first sub-pixel electrode 90 may be disposed on each pixel, and may have a shape in which no opening is defined. The planar shape of the first sub-pixel electrode 90 will be described later.

A pixel insulating layer 100 is disposed on the first sub-pixel electrode 90. The pixel insulating layer 100 may include or be made of an inorganic insulating material. The pixel insulating layer 100 may serve to insulate the first sub-pixel electrode 90 disposed on a lower portion thereof, a second sub-pixel electrode 111 disposed on an upper portion thereof, and a floating electrode 112 from one another.

The second sub-pixel electrode 111 and the floating electrode 112 are disposed on the pixel insulating layer 100. In such an embodiment, the second sub-pixel electrode 111 and the floating electrode 112 may include or be made of a transparent conductive material, such as ITO, IZO, ITZO, or AZO.

In such an embodiment, the second sub-pixel electrode 111 may be connected to the drain electrode 53 and the first sub-pixel electrode 90 through the contact hole CH, and may receive the data voltage that is applied from the drain electrode 53. However, the floating electrode 112 is disconnected from the first sub-pixel electrode 90, the second sub-pixel electrode 111 and the drain electrode 53, and may not directly receive the data voltage. In such an embodiment, the floating electrode 112 may maintain a floating state in which a separate signal is not directly applied thereto. However, the floating electrode 112 may indirectly receive the voltage that is applied from the first sub-pixel electrode 90. In such an embodiment, the floating electrode 112 is capacitively coupled to the first sub-pixel electrode 90 to receive the voltage therefrom.

Here, the voltage that the floating electrode 112 receives through the capacitive coupling to the first sub-pixel electrode 90 will be referred to as a coupling voltage.

In such an embodiment, a common voltage is applied to a common electrode 340 to be described later, and a difference between the coupling voltage and the common voltage may be smaller than a difference between the data voltage and the common voltage. Accordingly, the intensity of an electric field that is formed in the liquid crystal layer 2000 by the coupling voltage may be weaker than the intensity of an electric field that is formed in the liquid crystal layer 2000 by the data voltage.

In such an embodiment, the floating electrode 112 is disposed in a section that partially overlaps the first sub-pixel electrode 90, and the pixel insulating layer 100 is arranged between the first sub-pixel electrode 90 and the floating electrode 112. However, in such an embodiment, when the thickness of the pixel insulating layer 100 is substantially small, capacitance occurs between the first sub-pixel electrode 90 and the floating electrode 112, and if a voltage is applied to the first sub-pixel electrode 90, the voltage may be induced in the floating electrode 112, such that the floating electrode 112 may have the coupling voltage. However, since the coupling voltage is a voltage that is induced by the voltage value of the data voltage, the difference between the coupling voltage and the common voltage may be further decreased.

In such an embodiment, each pixel includes a pixel region that transmits light and a non-pixel region covered by the data line 51 and the light blocking member 320 to be described later to intercept the light. The first sub-pixel electrode 90, the second sub-pixel electrode 111 and the floating electrode 112 may be mainly arranged on the pixel region, and the switching device TR, the gate line 21, and the sustain line 23 may be mainly arranged on the non-pixel region.

In an embodiment, the pixel region may be divided into four quadrants by a straight line which extends in the first direction D1 and passes through the center of the pixel region and a straight line which extends in the second direction D2 and passes through the center of the pixel region. In such an embodiment, the pixel region includes a region that corresponds to the first quadrant on the upper right side, a region that corresponds to the second quadrant on the upper left side, a region that corresponds to the third quadrant on the lower left side, and a region that corresponds to the fourth quadrant on the lower right side.

In such an embodiment, the floating electrode 112 may be disposed in the regions that correspond to the four quadrants. In such an embodiment, the floating electrode 112 may include a first floating electrode 112_1 arranged in the first quadrant, a second floating electrode 112_2 arranged in the second quadrant, a third floating electrode 112_3 arranged in the third quadrant, and a fourth floating electrode 112_4 arranged in the fourth quadrant.

The first to fourth floating electrodes 112_1, 112_2, 112_3, and 112_4 may include a plurality of branch electrodes 112_1a, 112_2a, 112_3a, and 112_4a that extend in directions that are tilted against the first and second directions D1 and D2, and connection electrodes 112_1b, 112_2b, 112_3b, and 112_4b that extend along a border of the pixel region to connect the branch electrodes 112_1a, 112_2a, 112_3a, and 112_4a. Since the first to fourth floating electrodes 112_1, 112_2, 112_3, and 112_4 include the branch electrodes 112_1a, 112_2a, 112_3a, and 112_4a, slits that are openings arranged between the branch electrodes 112_1a, 112_2a, 112_3a, and 112_4a may be formed. As a result, due to tilt angles between the branch electrodes 112_1a, 112_2a, 112_3a, and 112_4a and the slits, the first to fourth floating electrodes 112_1, 112_2, 112_3, and 112_4 may form electric fields having different directivities, and the alignment directions of the liquid crystal molecules 220 of the liquid crystal layer 2000 to be described later may differ from one another in the regions corresponding to the first to fourth floating electrodes 112_1, 112_2, 112_3, and 112_4, respectively. Since the alignment directions of the liquid crystal molecules 220 in the pixel region differ from one another, visual recognition of the liquid crystal display may be improved.

In such an embodiment, the second sub-pixel electrode 111 may include a first stem portion that extends along a boundary between the third floating electrode 112_3 and the fourth floating electrode 112_4, a second stem portion that extends along a boundary between the first floating electrode 112_1 and the fourth floating electrode 112_4 and a boundary between the second floating electrode 112_2 and the third floating electrode 112_3, and a third stem portion having one end connected to the first stem portion and the other end connected to the switching device TR and arranged on the outside of the pixel region. In such an embodiment, the second sub-pixel electrode 111 may have a T-like shape in the pixel region.

The third stem portion may receive the data voltage that is applied from the switching device TR. Since the third stem portion is connected to the first stem portion and the first stem portion is connected to the second stem portion, the data voltage may be provided to the overall region of the second sub-pixel electrode 111.

In such an embodiment, the first sub-pixel electrode 90 may be arranged in a center of the pixel region, and may be in a planar shape in which no opening is defined. The first sub-pixel electrode 90 may be arranged to overlap parts of the first to fourth floating electrodes 112_1, 112_2, 112_3, and 112_4. As described above, the first to fourth floating electrodes 112_1, 112_2, 112_3, and 112_4 may receive the coupling voltage through the region that overlaps the first sub-pixel electrode 90. In such an embodiment, the level of the coupling voltage may be controlled through adjustment of an area in which the first sub-pixel electrode 90 overlaps the first to fourth floating electrodes 112_1, 112_2, 112_3, and 112_4.

In such an embodiment, the first floating electrode 112_1 and the second floating electrode 112_2 may be arranged adjacent to each other in the first direction D1. In such an embodiment, the third floating electrode 112_3 and the fourth floating electrode 112_4 may be arranged in the first direction D1, but the second sub-pixel electrode 111 may be arranged between the third floating electrode 112_3 and the fourth floating electrode 112_4. Accordingly, the gap distance W2 between the first floating electrode 112_1 and the second floating electrode 112_2 may be shorter than the gap distance between the third floating electrode 112_3 and the fourth floating electrode 112_4.

In such an embodiment, the third floating electrode 112_3 and the fourth floating electrode 112_4, which are substantially relatively distant from each other, may not be affected by each other, but may be affected by the second sub-pixel electrode 111. In such an embodiment, the first floating electrode 112_1 and the second floating electrode 112_2 are arranged relatively close to each other in the first direction D1, the first floating electrode 112_1 and the second floating electrode 112_2 may directly affect each other.

In such an embodiment, the electric field that is formed in the liquid crystal layer 200 on the boundary between the first floating electrode 112_1 and the second floating electrode 112_2 that are adjacent to each other may be affected by both the first floating electrode 112_1 and the second floating electrode 112_2. In such an embodiment, since the first floating electrode 112_1 and the second floating electrode 112_2 may be symmetrically formed, the electric field that is formed along the boundary between the first floating electrode 112_1 and the second floating electrode 112_2 that are adjacent to each other may be symmetrically formed in the same manner. As a result, when an electric field is formed, the liquid crystal molecules 220 that are arranged along the boundary between the first floating electrode 112_1 and the second floating electrode 112_2 that are adjacent to each other may be tilted toward the second direction D2.

In such an embodiment, if the liquid crystal molecules 220 in a region are arranged to be tilted toward the first direction D1 or the second direction D2, the region may be visually recognized as a dark portion. In such an embodiment, if the liquid crystal molecules 220 in a region are arranged to be tilted against the first direction D1 or the second direction D2, the region may transmit light and may be visually recognized as a bright portion. Accordingly, the boundary between the first floating electrode 112_1 and the second floating electrode 112_2 that are adjacent to each other may be visually recognized as a dark portion.

Here, in an embodiment where the first floating electrode 112_1 and the second floating electrode 112_2 are arranged to be spaced apart from each other, when viewed from the top plan view, with a distance of about 2 micrometers (μm) to about 4 μm, e.g., a distance of about 3 μm, the width of the dark portion in the first direction D1, which is formed along the boundary between the first floating electrode 112_1 and the second floating electrode 112_2 that are adjacent to each other, may be minimized. Accordingly, in such an embodiment, the region that is occupied by the dark portion may be minimized so that the dark portion is visually recognized as thin as possible. Accordingly, the transmittance of the liquid crystal display may be improved to the extent that the region that is occupied by the dark portion in the pixel region is minimized. Here, if the first floating electrode 112_1 and the second floating electrode 112_2 are spaced apart from each other with a distance that is shorter than about 2 μm, the mutual influence therebetween may become too strong to rather increase a texture, while if the first floating electrode 112_1 and the second floating electrode 112_2 are spaced apart from each other for a distance greater than about 4 μm, the intensity of the electric field that is formed between the first floating electrode 112_1 and the second floating electrode 112_2 may become weak to reduce the transmittance.

In such an embodiment, the pixel region may include first to third regions A, B and C. Here, the first region A means a region in which the second sub-pixel electrode 111 is arranged, the second region B means a region in which the first sub-pixel electrode 90 and the floating electrode 112 overlap each other, and the third region C means a region in which a portion of the floating electrode 112 is that does not overlap the first sub-pixel electrode 90 is arranged.

The intensities of the electric fields formed in the liquid crystal layers 2000 arranged in the first to third regions A, B, and C may differ from one another. In such an embodiment when the data voltage having a certain voltage value is applied to a pixel, the intensities of the electric fields formed in the liquid crystal layers 2000 arranged in the first to third regions A, B, and C of the pixel may differ from one another. In such an embodiment, the intensity of the electric field that is formed in the liquid crystal layer 2000 arranged in the first region A may be higher than the intensity of the electric field that is formed in the liquid crystal layer 2000 arranged in the second region B, and the intensity of the electric field that is formed in the liquid crystal layer 2000 arranged in the second region B may be higher than the intensity of the electric field that is formed in the liquid crystal layer 2000 arranged in the third region C.

The intensity difference between the electric fields may be determined by the arrangements of the first sub-pixel electrode 90, the second sub-pixel electrode 111 and the floating electrode 112. In an embodiment, as described above, the pixel region may be divided into the first region A in which the second sub-pixel electrode 111 is arranged, and the second and third regions B and C in which the floating electrode 112 is arranged. Here, the second sub-pixel electrode 111 is electrically connected to the switching device TR to receive the voltage from the switching device TR, and the floating electrode 112 may be in a floating state. Even in the floating state, the floating electrode 112 may receive the coupling voltage that is applied from the first sub-pixel electrode 90, but as described above, the difference between the coupling voltage and the common voltage is smaller than the difference between the data voltage that is applied from the switching device TR and the common voltage. Accordingly, the intensity of the electric field that is formed in the liquid crystal layer 2000 arranged in the first region A may be higher than the intensity of the electric field that is formed in the second and third regions B and C.

In such an embodiment, the electric fields formed in the liquid crystal layers 2000 arranged in the second and third regions B and C may be formed by the coupling voltage that is formed on the floating electrode 112. In such an embodiment, as shown in FIG. 3, the second region B is arranged to overlap the first sub-pixel electrode 90, and only the floating electrode 112 is arranged in the third region C. Accordingly, even if the first sub-pixel electrode 90 is arranged to be farther from the liquid crystal layer 2000 than the floating electrode 112, the electric field that is formed in the liquid crystal layer 2000 arranged in the second region B may be affected by both the coupling voltage formed on the floating electrode 112 and the voltage that is provided from the switching device TR to the first sub-pixel electrode 90. As a result, the intensity of the electric field that is formed in the liquid crystal layer 2000 arranged in the second region B may be higher than the intensity of the electric field that is formed in the liquid crystal layer 2000 arranged in the third region C.

The liquid crystal molecules 220 of the liquid crystal layers 2000 arranged in the first to third regions A, B, and C may be tilted against a direction that is perpendicular to the first base substrate 10 based on the electric fields formed in the first to third regions A, B, and C. In such an embodiment, the tilt angle of the liquid crystal molecules 220 is in proportion to the intensity of the electric field that is formed in the liquid crystal layer 2000. Accordingly, the tilt angle $\theta h$ of the liquid crystal molecules 220 of the liquid crystal layer 2000 arranged in the first region A may be larger than the tilt angle $\theta m$ of the liquid crystal molecules 220 of the liquid crystal layer 2000 arranged in the second region B. In such an embodiment, the tilt angle $\theta m$ of the liquid crystal molecules 220 of the liquid crystal layer 2000 arranged in the second region B may be larger than the tilt angle $\theta l$ of the liquid crystal molecules 220 of the liquid crystal layer 2000 arranged in the third region C.

As described above, in an embodiment where the intensities of the electric fields that are formed in the liquid crystal layers 2000 of the first to third regions A, B, and C and the tilt angles of the liquid crystal molecules 220 are set to be different from one another, side visibility of the liquid crystal display may be improved.

In an embodiment, when viewed from the top plan view, the sustain line 23 may be disposed to be spaced apart from the first to fourth floating electrodes 112_1, 112_2, 112_3, and 112_4 with a predetermined distance. In such an embodiment, the gap distance W1 between the sustain line 23 and the pixel electrodes, e.g., the first sub-pixel electrode 90, the second sub-pixel electrode 111 and the floating electrode 112, may be in a range of about 3 μm to about 4 μm. In such an embodiment, a texture that is generated by the sustain line 23 is not formed in the pixel region, but is formed in the non-pixel region to minimize the reduction of the transmittance.

The texture that is generated by the sustain line 23 may be caused by the step height of the sustain line 23. in an embodiment, as shown in FIG. 2, the step height may occur on constituent elements on the sustain line 23 due to the thickness of the sustain line 23, and even if planarization thereof is performed by the planarization layer 80, the step height SH may still somewhat remain. As a result, a surface step height of the liquid crystal layer 200 may occur due to the step height of the sustain line 23 as shown in FIG. 2, and an undesired force may act on the liquid crystal molecules 220 due to the surface step height of the liquid crystal layer 2000. As a result, at a point where a force that acts on the liquid crystal molecules 220 due to the electric field that is formed in the pixel region and a force that acts on the liquid crystal molecules 220 due to the surface step height of the liquid crystal layer 2000 are balanced, the liquid crystal molecules 221 may be arranged toward a direction that is perpendicular to the first base substrate 10 without being tilted in any direction. In such an embodiment, since the liquid crystal molecules 221 in the region in which the step height SH occurs are not tilted, they may be visually recognized as black, and a texture may be generated around the liquid crystal molecules 221 that are visually recognized as black.

In such an embodiment, if the sustain line 23 is spaced apart from the first sub-pixel electrode 90, the second sub-pixel electrode 111, and the floating electrode 112 with a predetermined distance W2, the texture that is caused by the liquid crystal molecules 220 that are visually recognized as black may be generated in the non-pixel region. Since the non-pixel region is a region that does not transmit the light, the texture may not be visually recognized from the outside. In one embodiment, for example, the gap distance between the sustain line 23 and the first sub-pixel electrode 90, the second sub-pixel electrode 111, and the floating electrode 112 may be about 3.5 μm. in such an embodiment, if the gap distance is smaller than about 3.5 μm, the texture may be generated in the pixel region, while if the gap distance is larger than about 3.5 μm, an area that is occupied by the non-pixel region increases, and thus the overall transmittance of the liquid crystal device may be reduced.

However, the gap distance W2 is not limited thereto, and in a partial section of the sustain line 23. In an embodiment, as shown in FIG. 1, in a section where the sustain line 23 is arranged to overlap the data line 51, as demanded on design, the sustain line 23 may be arranged close to the first sub-pixel electrode 90, the second sub-pixel electrode 111, and the floating electrode 112 for a distance that is shorter than about 3.5 μm. As a result, the sustain line 23 may extend in a zigzag pattern, but in consideration of the plurality of pixels, the sustain line 23 may be arranged to extend substantially in the first direction D1 as a whole.

Hereinafter, the opposite substrate 3000 will be described in detail.

In an embodiment, as shown in FIG. 2, the opposite substrate 3000 includes a second base substrate 310, a light blocking member 320, an overcoat layer 330, and a common electrode 340.

The second base substrate 310 is arranged opposite to the first base substrate 10. The second base substrate 310 may have durability to endure impacts from the outside. The second base substrate 310 may be a transparent insulating substrate. In one exemplary embodiment, for example, the second base substrate 310 may include or be formed of a glass substrate, a quartz substrate, or a transparent resin substrate. In one embodiment, for example, the second base substrate 310 may include high heat resistance polymer or plastic. The second base substrate 310 may be a flat plate type, or may be curved in a specific direction.

In some embodiments, the second base substrate 310 may be a flexible substrate. In such embodiment, the second base substrate 310 may be a substrate having a changeable shape, such as rolling, folding, or bending.

In an embodiment, the light blocking member 320 is disposed on the second base substrate 310 (lower portion in the drawing). The light blocking member 320 may be arranged to overlap the switching device TR, the data line 51 and the gate line 21 of each of the pixels. The light blocking member 320 may effectively prevent the switching device TR, the data line 51, the gate line 21, and other constituent elements of each of the pixels from being visually recognized by a user due to light reflection therefrom, and may intercept light leakage due to misalignment of the liquid crystal molecules 220.

The overcoat layer 330 is disposed on the light blocking member 320 (lower portion in the drawing). The overcoat layer 330 may serve to protect the light blocking member 320 as planarizing the step height that occurs due to the above-described constituent elements. However, the overcoat layer 330 may be omitted in accordance with the shape and the constituent material of the light blocking member 320.

The common electrode 340 is disposed on the overcoat layer 330 (lower portion in the drawing). The common electrode 340 may be disposed to cover substantially the whole surface of the second base substrate 310. The common electrode 340 may include or be made of a transparent conductive material, such as ITO, IZO, ITZO, or AZO. A common voltage is applied to the common electrode 340, and the common electrode 340 may form an electric field in the liquid crystal layer 2000 through mutual interaction with the first sub-pixel electrode 90, the second sub-pixel electrode 111 and the floating electrode 112.

Hereinafter, the liquid crystal layer 2000 will be described in detail.

The liquid crystal layer 2000 includes a plurality of liquid crystal molecules 220 having dielectric anisotropy. The liquid crystal molecules 220 may be vertically aligned liquid crystal molecules 220 that are arranged between the array substrate 1000 and the opposite substrate 3000 in a direction that is perpendicular to the both substrates 1000 and 3000, or in a thickness direction of the both substrates 1000 or 3000. When an electric field is formed between the array substrate 1000 and the opposite substrate 3000, the liquid crystal molecules 220 are tilted in a specific direction between the array substrate 1000 and the opposite substrate 3000 to change the polarization state of light that passes through the liquid crystal layer 2000. Each of the pixels may transmit or intercept the light in accordance with the change of the polarization state of the light that occurs in the liquid crystal layer 2000.

In such an embodiment, the liquid crystal layer 2000 may further include an upper alignment layer 230 and a lower alignment layer 210 to pre-tilt the liquid crystal molecules 220. The upper alignment layer 230 may be disposed on a lower portion of the overcoat layer 330, and the lower alignment layer 210 may be disposed on an upper portion of the pixel electrode. The upper alignment layer 230 and the lower alignment layer 210 may align the liquid crystal molecules 220 so that the liquid crystal molecules 220 are directed toward a specific direction on a plane on which the lower alignment layer 210 is formed in a state where the electric field is not applied to the liquid crystal molecules 220, and may align the liquid crystal molecules 220 so that the liquid crystal molecules 220 indicate a direction that forms an angle in a range of about 0.5° to about 3° against the direction that is perpendicular to the plane on which the lower alignment layer 210 is formed. Alternatively, any one or both of the upper and lower alignment layers 230 and 210 may be omitted. In such an embodiment, the pre-tilt may not be formed by the alignment layer, but may be formed due to the property itself of the liquid crystal molecules 220.

In an embodiment, due to the mutual interaction among the array substrate 1000, the opposite substrate 3000 and the liquid crystal layer 2000 as described above, the liquid crystal display may display a specific picture or image. In such an embodiment, due to the arrangement structure of the first sub-pixel electrode 90, the second sub-pixel electrode 111 and the floating electrode 112 as described above, the transmittance of the liquid crystal display may be improved.

Figure 4:
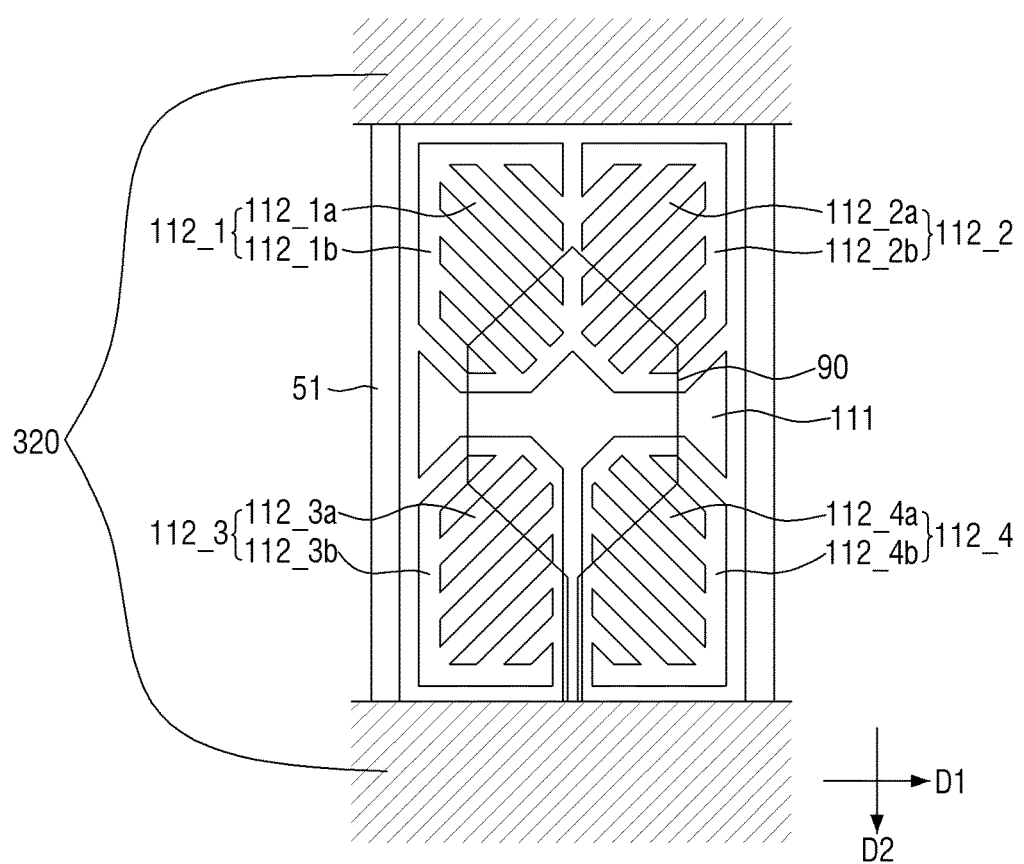
FIG. 4 is a plan view of a pixel of a liquid crystal display of FIG. 1 including a light blocking member.

FIG. 4 is a plan view of a pixel of a liquid crystal display of FIG. 1 with a light blocking member added thereto.

Referring to FIG. 4, in such an embodiment, when a user recognize the liquid crystal display, the transistor, the gate line 21 and the sustain line 23 of each of the pixels may not be visually recognized by the user. In such an embodiment, since the light leakage or texture that occurs in the non-pixel region is intercepted by the light blocking member 320, the user may visually recognize a picture or image in which the texture or light leakage is minimized.

Figure 5:
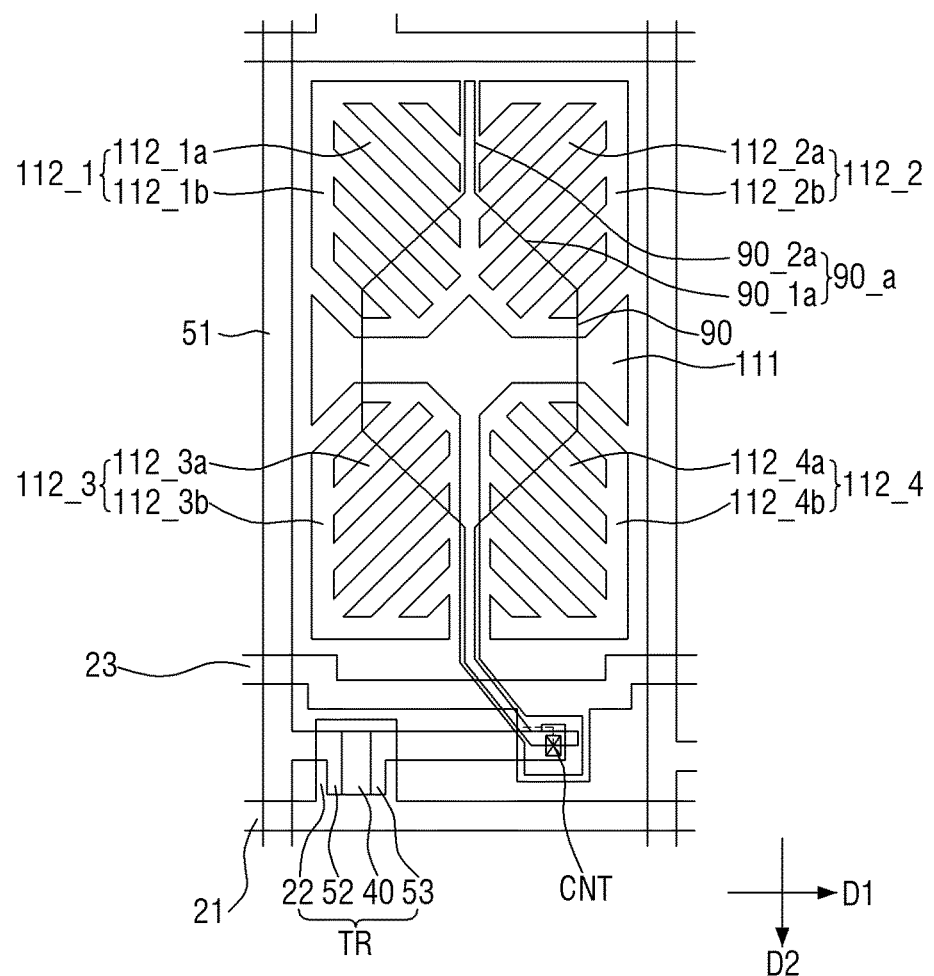
FIG. 5 is a plan view of a pixel of an alternative embodiment of a liquid crystal display according to the invention.

FIG. 5 is a plan view of a pixel of an alternative embodiment of a liquid crystal display according to the invention.

The pixel shown in FIG. 5 is substantially the same as the pixel in FIG. 1 except for the shape of the first sub-pixel electrode 90. The same or like elements shown in FIG. 5 have been labeled with the same reference characters as used above to describe the exemplary embodiments of the pixel shown in FIG. 1, and any repetitive detailed description thereof will hereinafter be omitted or simplified.

In an embodiment, as shown in FIG. 5, the first sub-pixel electrode 90 may further include a first projection electrode 91 that projects from the first sub-pixel electrode 90 along the boundary between the first floating electrode 112_1 and the second floating electrode 112_2.

The first projection electrode 91 may contribute to the minimization of the text that is generated along the boundary between the first floating electrode 112_1 and the second floating electrode 112_2, and may improve the transmittance of the liquid crystal display.

The first projection electrode 91 may be formed only along the boundary between the first floating electrode 112_1 and the second floating electrode 112_2, and since a portion (e.g., the first stem portion) of the second sub-pixel electrode 111 is arranged on the boundary between the third floating electrode 112_3 and the fourth floating electrode 112_4, the first projection electrode 91 may not be disposed on the boundary between the third floating electrode 112_3 and the fourth floating electrode 112_4.

The first projection electrode 91 may extend up to an end of one side of the pixel region in the first direction D1. In such an embodiment, the first projection electrode 91 may be arranged not to overlap the first floating electrode 112_1 and the second floating electrode 112_2. Accordingly, the length of the width of the first projection electrode 91 in the first direction D1 may be smaller than the gap distance (W2 shown in FIG. 1) between the first floating electrode 112_1 and the second floating electrode 112_2. In such an embodiment, since the gap distance between the first floating electrode 112_1 and the second floating electrode 112_2 may be equal to or larger than about 3.5 μm, the width of the first projection electrode 91 in the first direction D1 may be smaller than about 3 μm.

Figure 6:
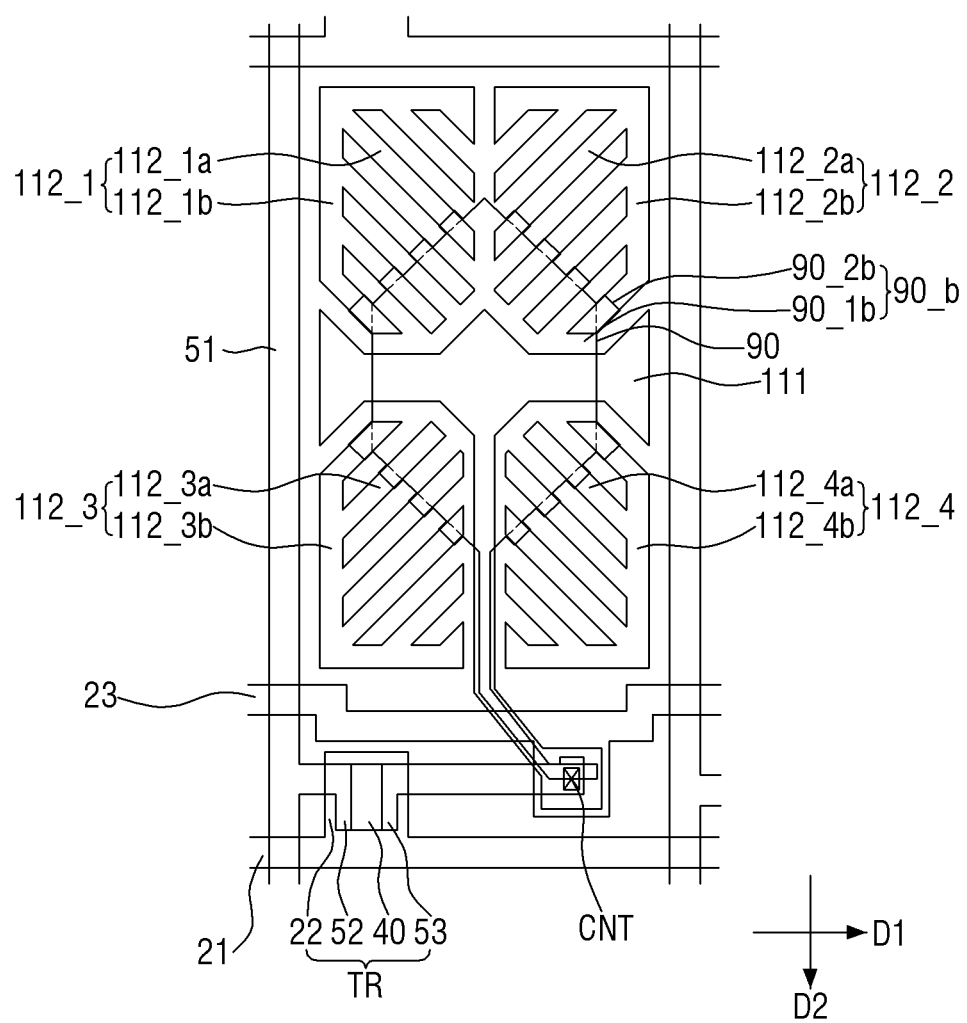
FIG. 6 is a plan view of a pixel of another alternative embodiment of a liquid crystal display according to the invention.

FIG. 6 is a plan view of a pixel of another alternative embodiment of a liquid crystal display according to the invention.

The pixel shown in FIG. 6 is substantially the same as the pixel in FIG. 1 except for the shape of the first sub-pixel electrode 90. The same or like elements shown in FIG. 6 have been labeled with the same reference characters as used above to describe the exemplary embodiments of the pixel shown in FIG. 1, and any repetitive detailed description thereof will hereinafter be omitted or simplified.

In an embodiment, as shown in FIG. 6, the first sub-pixel electrode 90 further includes a plurality of second projection electrodes 92_a that project along and to overlap the branch electrodes 112_1a, 112_2a, 112_3a, and 112_4a of the first to fourth floating electrodes 112_1, 112_2, 112_3, and 112_4.

Accordingly, in such an embodiment, an area in which the first sub-pixel electrode 90 and the floating electrode 112 overlap each other may be increased. In such an embodiment, as the area in which the first sub-pixel electrode 90 and the floating electrode 112 overlap each other is increased, the voltage value of the coupling voltage that is formed on the floating electrode 112 may be increased. Accordingly, the intensity of the electric field that is generated by the floating electrode 112 formed on the liquid crystal layer 2000 may be increased to improve the transmittance of the liquid crystal display. In such an embodiment, the degree of freedom on design of the area in which the first sub-pixel electrode 90 and the floating electrode 112 overlap each other may be improved.

In such an embodiment, the outer circumference that is formed by the first sub-pixel electrode 90 and the second projection electrode 92_a may be formed in the form of rectangular waves. In such an embodiment, two opposite corners of the second projection electrode 92_a are formed in parallel to a direction in which the branch electrodes 112_1a, 112_2a, 112_3a, and 112_4a of the floating electrode 112 extend, and the two remaining corners that face the second projection electrode 92_a are formed perpendicular to the direction in which the branch electrodes 112_1a, 112_2a, 112_3a, and 112_4a of the floating electrode 112 extend. As a result, the shape of the outer circumference that is formed by the first sub-pixel electrode 90 and the second projection electrode 92_a is in the form of rectangular waves.

Figure 7:
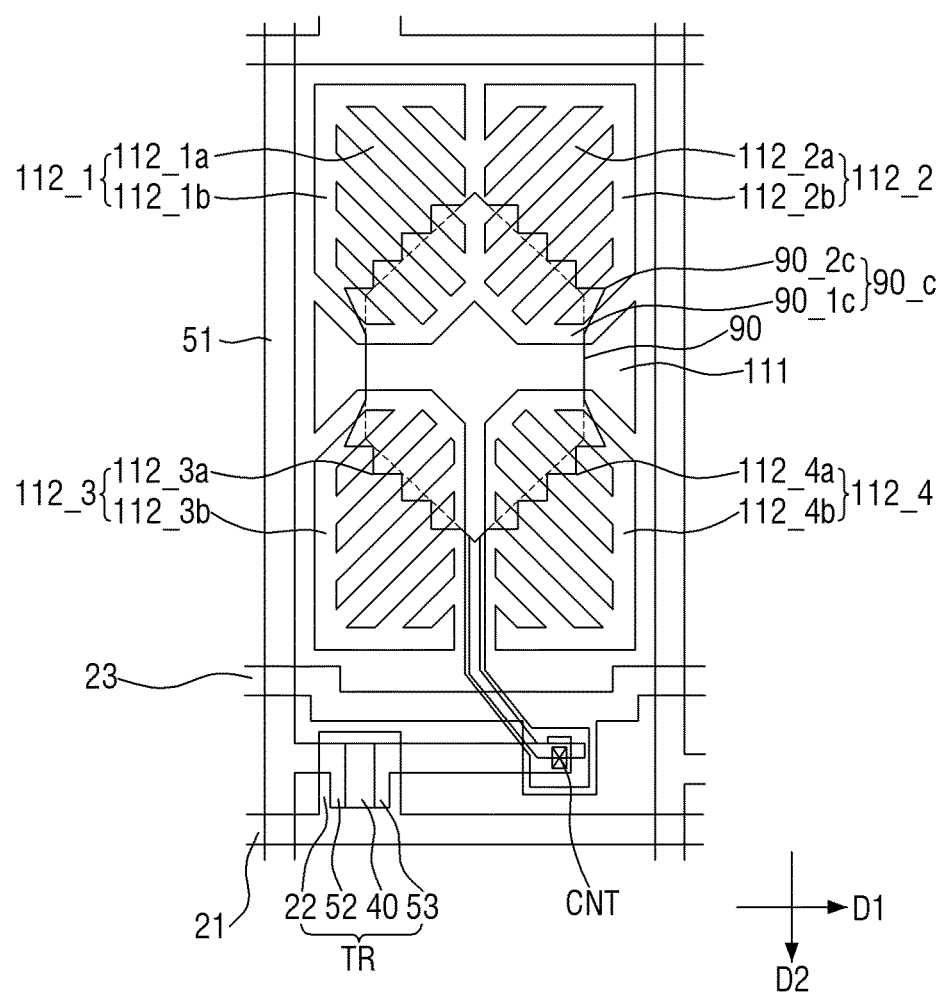
FIG. 7 is a plan view of a pixel of yet another alternative embodiment of a liquid crystal display according to the invention.

FIG. 7 is a plan view of a pixel of another alternative embodiment of a liquid crystal display according to the invention.

The pixel shown in FIG. 7 is substantially the same as the pixel in FIG. 6 except for the shape of a second projection electrode 92_b. The same or like elements shown in FIG. 6 have been labeled with the same reference characters as used above to describe the exemplary embodiments of the pixel shown in FIG. 6, and any repetitive detailed description thereof will hereinafter be omitted or simplified.

In an embodiment, as shown in FIG. 7, the second projection electrode 92_b may be formed so that the outer circumference that is formed by the first sub-pixel electrode 90 and the second projection electrode 92_b is in the form of triangular waves. In such an embodiment, two of three corners of the second projection electrode 92_b, which are not adjacent to the first sub-pixel electrode 90, may be formed toward a direction that is tilted against the direction in which the branch electrodes 112_1a, 112_2a, 112_3a, and 112_4a of the floating electrode 112 extend, and as a result, the shape of the outer circumference that is formed by the first sub-pixel electrode 90 and the second projection electrode 92_b is in the form of triangular waves.

In such an embodiment, the number of the outer corners of the second projection electrode 92_b is smaller than the number of the outer corners of the second projection electrode 92_a illustrated in FIG. 6 to facilitate the manufacturing thereof.

Figure 8:
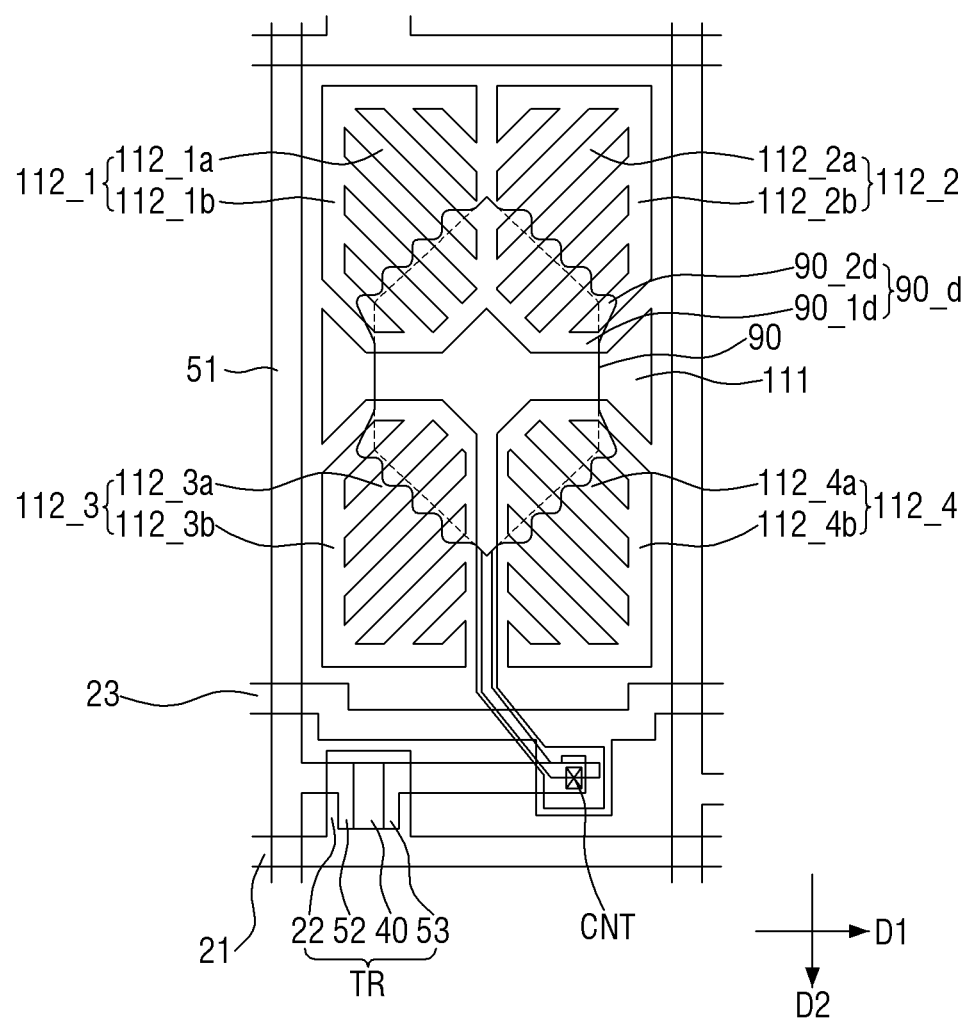
FIG. 8 is a plan view of a pixel of still another alternative embodiment of a liquid crystal display according to the invention.

FIG. 8 is a plan view of a pixel of another alternative embodiment of a liquid crystal display according to the invention.

The pixel shown in FIG. 8 is substantially the same as the pixel in FIG. 6 except for the shape of a second projection electrode 92_c. The same or like elements shown in FIG. 8 have been labeled with the same reference characters as used above to describe the exemplary embodiments of the pixel shown in FIG. 6, and any repetitive detailed description thereof will hereinafter be omitted or simplified.

In an embodiment, as shown in FIG. 8, the second projection electrode 92_c may be formed so that the outer circumference that is formed by the first sub-pixel electrode 90 and the second projection electrode 92_c is in the form of sine waves. In such an embodiment, the second projection electrode 92_c may be formed to have an outer side in the form of a curve, and as a result, the shape of the outer circumference that is formed by the first sub-pixel electrode 90 and the second projection electrode 92_c is in the form of sine waves.

This structure may be manufactured where the pattern of a mask that forms the first sub-pixel electrode 90 and the second projection electrode 92_c is designed to have a curved outer side. In such an embodiment, the mask pattern may be formed to have a curved outer side to solve the resolution problem on a mask process. In such an embodiment, a liquid crystal display manufactured using a mask process may have the shape of the first sub-pixel electrode 90 and the second projection electrode 92_c shown in FIG. 8.

Although some exemplary embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:
   a substrate on which a pixel region is defined;
   a first sub-pixel electrode disposed in the pixel region on the substrate;
   an insulating layer disposed on the first sub-pixel electrode;
   a second sub-pixel electrode disposed in the pixel region on the insulating layer;
   a floating electrode disposed in the pixel region on the insulating layer and disconnected from the second sub-pixel electrode;
   a liquid crystal layer disposed on the second sub-pixel electrode and the floating electrode; and
   a common electrode disposed on the liquid crystal layer,
   wherein the floating electrode comprises:
      a first floating electrode disposed in a first quadrant of four quadrants defined by dividing the pixel region by four;
      a second floating electrode arranged in a second quadrant of the four quadrants;
      a third floating electrode arranged in a third quadrant of the four quadrants; and
      a fourth floating electrode arranged in a fourth quadrant of the four quadrants,
   wherein the first to fourth floating electrodes are disposed to be spaced apart from one another, and
   the first sub-pixel electrode overlaps at least a portion of the second sub-pixel electrode and at least a portion of each of the first to fourth floating electrodes.

2. The liquid crystal display of claim 1, further comprising:
   a switching device disposed on the substrate to transfer a data voltage,
   wherein the first sub-pixel electrode and the second sub-pixel electrode are connected to the switching device to receive the data voltage from the switching device.

3. The liquid crystal display of claim 2, wherein the floating electrode is capacitively coupled to the first sub-pixel electrode to receive a floating voltage based on the data voltage applied to the first sub-pixel electrode.

4. The liquid crystal display of claim 3, wherein
   a common voltage is applied to the common electrode, and
   a difference between the floating voltage and the common voltage is smaller than a difference between the data voltage and the common voltage.

5. The liquid crystal display of claim 2, wherein the second sub-pixel electrode comprises:
   a first stem portion extending along a boundary between the third floating electrode and the fourth floating electrode;
   a second stem portion connected to the first stem portion and extending along a boundary between the first floating electrode and the fourth floating electrode and a boundary between the second floating electrode and the third floating electrode; and
   a third stem portion having one end connected to the first stem portion and the other end connected to the switching device.

6. The liquid crystal display of claim 1, further comprising:
   a gate line disposed on the substrate and extending in a first direction;
   a sustain line disposed on the substrate and extending in the first direction; and
   a data line disposed on the substrate and extending in a second direction which crosses the first direction, wherein the gate line, the sustain line and the data line are disposed in an outside of the pixel region.

7. The liquid crystal display of claim 6, wherein
the sustain line is arranged between the floating electrode and the gate line, and
the sustain line is spaced apart from the floating electrode with a distance in a range of about 3 µm to about 4 µm.

8. The liquid crystal display of claim 1, wherein a gap distance between the first floating electrode and the second floating electrode is shorter than a gap distance between the third floating electrode and the fourth floating electrode.

9. The liquid crystal display of claim 1, wherein the pixel region further comprises:
a first region in which the second sub-pixel electrode is disposed;
a second region in which the first sub-pixel electrode and the floating electrode are disposed to overlap each other; and
a third region in which the floating electrode is disposed, wherein the floating electrode in the third region does not overlap the first sub-pixel electrode,
wherein an intensity of an electric field formed in the liquid crystal layer of the first region is higher than an intensity of an electric field formed in the liquid crystal layer of the second region, and
an intensity of an electric field formed in the liquid crystal layer of the second region is higher than an intensity of an electric field formed in the liquid crystal layer of the third region.

10. The liquid crystal display of claim 1, wherein the first sub-pixel electrode comprises:
a first projection electrode projecting along a boundary between the first floating electrode and the second floating electrode.

11. The liquid crystal display of claim 1, wherein
each of the first to fourth floating electrodes further comprises:
a plurality of branch electrodes;
a plurality of connection electrodes which extends along a border of the pixel region and connects the branch electrodes,
the first sub-pixel electrode further comprises a plurality of second projection electrodes which project to overlap the branch electrodes of the first to fourth floating electrodes.

12. The liquid crystal display of claim 11, wherein
the second projection electrode is in the form of a rectangle, and
an outer circumference of the first sub-pixel electrode defined by the second projection electrode is in the form of rectangular waves.

13. The liquid crystal display of claim 11, wherein
the second projection electrode is in the form of a triangle, and
an outer circumference of the first sub-pixel electrode defined by the second projection electrode is in the form of triangular waves.

14. The liquid crystal display of claim 11, wherein
the second projection electrode is in the form of a curve, and
an outer circumference of the first sub-pixel electrode defined by the second projection electrode is in the form of sine waves.

15. A liquid crystal display comprising:
a substrate on which a pixel region is defined;
a gate line disposed on the substrate and extending in a first direction;
a sustain line disposed on the substrate and extending in the first direction;
a data line disposed on the substrate and extending in a second direction which crosses the first direction;
a first sub-pixel electrode disposed in the pixel region on the substrate;
an insulating layer disposed on the first sub-pixel electrode;
a second sub-pixel electrode disposed in the pixel region on the insulating layer;
a floating electrode disposed in the pixel region on the insulating layer and disconnected from the second sub-pixel electrode;
a liquid crystal layer disposed on the second sub-pixel electrode and the floating electrode; and
a common electrode disposed on the liquid crystal layer,
wherein the gate line, the sustain line, and the data line are disposed on an outside of the pixel region,
the sustain line is disposed between the floating electrode and the gate line, and
the sustain line is spaced apart from the floating electrode with a distance in a range of about 3 µm to about 4 µm.

16. The liquid crystal display of claim 15, wherein
the floating electrode comprises:
a first floating electrode disposed in a first quadrant of four quadrants defined by dividing the pixel region by four;
a second floating electrode disposed in a second floating electrode of the four quadrants;
a third floating electrode disposed in a third quadrant of the four quadrants; and
a fourth floating electrode disposed in a fourth quadrant of the four quadrants,
the first to fourth floating electrodes are disposed to be separated from one another, and
the first sub-pixel electrode overlaps at least a portion of the second sub-pixel electrode and at least a portion of each of the first to fourth floating electrodes.

17. The liquid crystal display of claim 16, further comprising:
a switching device disposed on the substrate to transfer a data voltage,
wherein the first sub-pixel electrode and the second sub-pixel electrode are connected to the switching device to receive the data voltage from the switching device.

18. The liquid crystal display of claim 17, wherein
the floating electrode is capacitively coupled to the first sub-pixel electrode to receive a floating voltage when the first sub-pixel electrode receives the data voltage,
a common voltage is applied to the common electrode, and
a difference between the floating voltage and the common voltage is smaller than a difference between the data voltage and the common voltage.

19. The liquid crystal display of claim 17, wherein the second sub-pixel electrode comprises:
a first stem portion extending along a boundary between the third floating electrode and the fourth floating electrode;
a second stem portion connected to the first stem portion and extending along a boundary between the first floating electrode and the fourth floating electrode and a boundary between the second floating electrode and the third floating electrode; and a third stem portion having one end connected to the first stem portion and the other end connected to the switching device.

20. The liquid crystal display of claim 16, wherein a gap distance between the first floating electrode and the second floating electrode is shorter than a gap distance between the third floating electrode and the fourth floating electrode.

* * * * *